United States Patent [19]

Veselovsky et al.

[11] 4,119,681

[45] Oct. 10, 1978

[54] ADHESIVE

[76] Inventors: Roman Alexandrovich Veselovsky, Kharkovskoe shosse, 21/3, kv. 179; Tatyana Esperovna Lipatova, Vladimirskaya ulitsa, 51/53, kv. 22; Raisa Alexandrovna Kimgir, ulitsa Vernadskogo, 65, kv. 105; Jury Konstantinovich Znachkov, ulitsa Dobrokhotova, 5, kv. 177, all of Kiev; Dmitry Maximovich Pyanykh, Pionersky, ulitsa Gospitalnaya, 16, Kaliningradskaya oblast; Nuribek Nabievich Shmanov, ulitsa Baimukhanova, 26A, kv. 5, Guriev; Nikolai Dmitrievich Trifonov, ulitsa Prazhskaya, 29/1, kv. 69; Konstantin Alexeevich Zabela, ulitsa Podvysotskogo, 10A, kv. 66, both of Kiev, all of U.S.S.R.

[21] Appl. No.: 695,408

[22] Filed: Jun. 14, 1976

[51] Int. Cl.$^2$ .............................................. C08L 75/00
[52] U.S. Cl. .......................... 260/859 R; 204/159.15
[58] Field of Search ................ 260/859, 859 R, 839 R

[56] References Cited

U.S. PATENT DOCUMENTS

| | | | |
|---|---|---|---|
| 3,509,234 | 4/1970 | Burlant | 260/859 |
| 3,578,728 | 5/1971 | Ehrhart | 260/859 |
| 3,641,199 | 2/1972 | Niederhauser | 260/859 |
| 3,677,920 | 7/1972 | Kai | 260/859 |
| 3,772,404 | 11/1973 | Knight | 260/859 |
| 3,859,381 | 1/1975 | Hutchinson | 260/859 |
| 3,860,537 | 1/1975 | Graham | 260/859 |
| 3,871,908 | 3/1975 | Spoor | 260/859 |
| 3,886,229 | 5/1975 | Hutchinson | 260/858 |
| 3,907,751 | 9/1975 | Knight | 260/859 |
| 3,933,728 | 1/1976 | Henbest | 260/859 |
| 3,989,609 | 11/1976 | Brack | 260/859 R |

FOREIGN PATENT DOCUMENTS

| | | | |
|---|---|---|---|
| 1,373,182 | 11/1974 | United Kingdom | 260/859 |
| 1,393,782 | 5/1975 | United Kingdom | 260/859 |
| 1,409,282 | 10/1975 | United Kingdom | 260/859 |

*Primary Examiner*—Paul Lieberman
*Attorney, Agent, or Firm*—Steinberg & Blake

[57] ABSTRACT

The invention provides adhesive consisting of a solution of an unsaturated polyester which is a product of interacting dicarboxylic acids with polyols in an unsaturated monomer, an urethane modifier, and a polymerization agent with the following ratio between the components in weight parts:

| | |
|---|---|
| unsaturated polyester solution in unsaturated monomer | 100 |
| urethane modifier | 10–300 |
| polymerization agent | 0.1–15. |

The urethane modifier is the product of the interaction of a urethane prepolymer which is a product of interaction of aromatic diisocyanate with hydroxyl-containing polyesters with a fluorinated alcohol of the general formula $C_nF_{2n+1}OH$, where $n = 1$–15, and with ethyleneglycol monomethacrylate. The proposed adhesive is suitable for repairing oil reservoirs and oil tanks, for sealing and mounting oil pipelines, for strengthening corroded ship structures, for bonding together natural stone and glass-fibre plastics in air, in water, and in a petrochemical medium.

1 Claim, No Drawings

ADHESIVE

The present invention relates to an adhesive applied for bonding together metals, glass-fibre plastics, concrete, and natural stone in air, water, and in a petrochemical medium.

Known in the art is an adhesive containing a solution of an unsaturated polyester which is a product of interaction between carboxylic acids with polyols in styrene, methylmethacrylate, or oligoesteracrylate, a product of interaction between allyl alcohol with toluelenediisocyanate, and polymerization agents.

The bonds between metals made with this adhesive are not water-resistant. Besides the known adhesive does not bond together surfaces contaminated with petrochemicals. Considerable internal stresses up to 200 kg/cm$^2$ arise at the joints. This decreases the strength of the joints and rules out the use of the adhesive for making seals.

It is an object of the invention to provide an adhesive suitable for gluing surfaces contaminated with petrochemicals.

Another object of the invention is to decrease internal stresses in glue lines and increase water-resistance of glue joints. In accordance with said and other objects, the essence of the invention consists in an adhesive including a solution of an unsaturated polyester which is a product of interaction between carboxylic acids with polyols in an unsaturated monomer, and a polymerization agent, which, according to the invention, contains also an urethane modifier, which is a product of interaction between aromatic diisocyanate and hydroxyl-containing polyesters, with fluorinated alcohol of the general formula $C_nF_{2n+1}OH$, where $n = 1-15$, and with ethyleneglycol monomethacrylate, the ratio between said components in weight parts being as follows:

| | |
|---|---|
| solution of unsaturated polyester in unsaturated monomer | 100 |
| urethane modifier | 10-300 |
| polymerization agent | 0.1-15. |

Introduction of the urethane modifier into the adhesive composition makes it possible to bond together surfaces contaminated with petrochemicals, to effect bonding in a petrochemical medium, to increase the elasticity of the hardened adhesive, to decrease the internal stress in the joint by more than 10 times, and to increase the adhesive strength and water resistance of the joints.

For sealing oil reservoirs, it is expedient to use adhesive of the following composition in wt. parts:

| | |
|---|---|
| 70% solution of oligodiethyleneglycolmaleate in styrene | 100 |
| product of interaction of urethane prepolymer obtained from toluelenediisocyanate and polydiethyleneglycol-adipate with perfluoropentyl alcohol ethyleneglycol and monomethacrylate | 50 |
| α-methylbenzoyl | 1. |

Said composition hardens under the effect of daylight.

A method of producing the proposed adhesive is accomplished in the following way.

A solution of an unsaturated polyester in a liquid unsaturated monomer, an urethane modifier obtained preliminarily, and a polymerization agent are mixed in the ratio (in wt. parts):

| | |
|---|---|
| solution of unsaturated polyester in unsaturated monomer | 100 |
| urethane modifier | 10-300 |
| polymerization agent | 0.1-15. |

When the content of the urethane modifier in the adhesive is less than 10 wt. parts, the properties of the adhesive are not improved. With the content increasing from 10 up to 300 wt. parts, an elastic adhesive is formed, the adhesive strength being higher when surfaces contaminated with petrochemicals are bonded together.

When the content of urethane modifier is more than 300 wt. parts, undesirable gaseous bubbles can be formed in the layer of hardened adhesive.

The amount of polymerization agent introduced into the adhesive depends on the required rate of adhesive hardening, since a rise in the amount of the agent accelerates the adhesive hardening.

Unsaturated polyester used as a solution in an unsaturated monomer is a product of interacting unsaturated or a mixture of unsaturated and saturated dicarboxylic acids with polyols. As dicarboxylic acids use is made of, for example, maleic, phthalic, sebacic, or fumaric acid. Ethyleneglycol, diethyleneglycol, triethyleneglycol glycerin, or trimethylpropane are used as polyols. For dissolving unsaturated polyesters, unsaturated monomers are used as solvents, for example, styrene and its derivatives, esters of acrylic and methacrylic acids, esters of cyanuric and isocyanuric acids, or oligoesteracrylates. The amount of the solvent is 20-60 wt. parts.

As polymerization agents use is made of substances promoting polymer formation upon copolymerization of the adhesive components containing polymerizable double bonds. Among these are commonly used peroxides, hydroperoxides, azocompounds, photoinitiators, for example, α-substituted benzoylalkyl esters, catalysts such as salts and complexes of metals, and acids.

To reduce the time of adhesive hardening, the polymerization accelerators, namely, tertiary amines or metal salts, can be introduced into the adhesive composition together with peroxides, and hydroperoxides. Photoinitiators are used in the case when the adhesive is applied for sealing of a coating, or as a binder for glass-fibre plastics.

An urethane modifier introduced into the adhesive composition is obtained on the basis of urethane prepolymer which is a product of interacting hydroxyl-containing polyester with aromatic diisocyanate.

An urethane modifier is a product of interaction of a urethane prepolymer with fluorinated alcohol and ethyleneglycol monomethacrylate.

Further on, for the sake of simplicity, the following notation will be used:

a solution of unsaturated polyester which is a product of interacting dicarboxylic acids with polyols in an unsaturated monomer — solution I;

an urethane prepolymer which is a product of interacting aromatic diisocyanate and hydroxyl-containing polyesters — product II;

a product of interacting said urethane prepolymer with fluorinated alcohol and ethyleneglycol monomethacrylate — product V.

As hydroxyl-containing polyester in synthesis of product II use is made of adipic, phthalic, or sebacic acid and polyols, namely, ethyleneglycol, diethyleneglycol, triethyleneglycol; as aromatic diisocyanate use is made of toluelendiisocyanate, 4,4'-diphenylmethanediisocyanate, or naphtylenediisocyanate.

As a fluorinated alcohol in producing product V use is made of a substance of the general formula $C_nF_{2n+1}OH$, where $n$ is within the range of 1-15. If $n$ is greater than 15, the product obtained combines badly with solution I.

The molar ratio between the initial components for synthesis of product V, namely between urethane prepolymer, fluorinated alcohol, and ethyleneglycol monomethacrylate, lies in the range of 1:0.1:0.1 to 1:1.9:0.1 or 1:0.1:0.1 to 1:0.1:1.9.

If the content of fluorinated alcohol in product V grows, adhesive strength in bonding together surfaces contaminated with petrochemicals and water-resistance increase, but cohesive strength decreases.

Product II is synthesized as follows. 1 mole of hydroxyl-containing polyester and 2 moles of aromatic diisocyanate are put into a reactor. The mixture is stirred at 50°-65° C in a dry inert gas atmosphere until isocyanate groups react completely.

To synthesize product V, urethane prepolymer (product II) is put into a reactor and fluorinated alcohol is slowly added under stirring in a dry inert gas atmosphere. The reaction temperature is 55°-60° C. When the whole amount of fluorinated alcohol is added, the reaction mass is stirred for 0.5 hour and ethyleneglycol monomethacrylate is introduced. The mixture is stirred until all hydroxyl groups react.

The proposed adhesive is intended for repairing oil reservoirs, oil tanks, pipelines on ships, for sealing and mounting oil pipelines, for strengthening corroded ship structures and pipelines, for bonding together natural stone, and for use as water- and oil-resistant coating for concrete.

The use of urethane modifier doubles the adhesive strength when bonding together dry surfaces and makes possible the application of the adhesive in gasoline, kerosene, oil, and lubricants, a decrease in adhesive strength not being observed when the resulting joints operate in these media. An urethane modifier not only endows the adhesive with an ability to bond in water, but forms joints with high water-resistance, thus allowing for application of the adhesive for repairing and mounting under-water pipelines and ships. The proposed adhesive has no rivals when it is necessary to effect bonding simultaneously in water and petrochemical medium.

The proposed adhesive possesses also good stability towards attrition; the stability towards erosive wear under the action of cast-iron chip in water is 10 times higher than that of concrete based on portland cement.

The proposed adhesive can be used for moulding glass-fibre plastics in air, under water, and in a medium of petrochemicals. Glass-fibre plastic, at the moment of moulding, can be bonded to a damaged spot of the structure for strengthening. Tensile strength of glass-fibre plastic at 50% filling moulded in a medium of petrochemicals is 3,000 kg/cm$^2$.

Physico-mechanical properties of adhesive-bonded joints of steel with the use of the proposed adhesive are as follows:

| | |
|---|---|
| resistance to direct even pull when bonding together dry surfaces | - 400 kg/cm$^2$ |
| " in water | - 150 kg/cm$^2$ |
| " in oil | - 100 kg/cm$^2$. |

A drop in strength on keeping during 50 days, %:

| | |
|---|---|
| in oil | no less than 5 |
| in water | less than 10. |

An introduction of urethane modifier into the adhesive decreases internal stresses in an adhesive layer by 10 times and equilibrium elasticity modulus of the hardened adhesive by 10-100 times.

For a better understanding of the present invention specific examples of producing and using the proposed adhesive are given hereinbelow by way of illustration.

EXAMPLE 1

An adhesive consists of the following components in weight parts:

| | |
|---|---|
| 70% solution of oligodiethyleneglycol maleate in styrene | 100, |
| product of interacting 1 mole of urethane prepolymer, obtained from toluelenediisocyanate and polydiethyleneglycoladipinate, with 0.5 mole of perfluoropentyl alcohol and 0.5 mole of ethyleneglycol monomethacrylate | 50, |
| α-methylbenzoyl | 1. |

To prepare this adhesive, 100 parts by weight of the 70% solution of oligodiethyleneglycol maleate in styrene are mixed with 50 parts by weight of the product of interacting 1 mole of urethane prepolymer, obtained from toluelenediisocyanate and polydiethyleneglycoladipinate, with 0.5 mole of perfluoropentyl alcohol and 0.5 mole of ethyleneglycol monomethanacrylate, and with 1 part by weight of α-methylbenzoyl. Glass fabric was impregnated with said adhesive and put on ship structures, such as decks and partitions subjected to most intensive corrosive wear. Paint and rust were removed from the construction surface; spot corrosion was not removed. The section repaired was not treated with solvents.

Said adhesive was used for sealing steel oil reservoir by coating leaky spots. Oil was not removed from the repaired sections. Air temperature during repairing was +15° C. The time of adhesive hardening was within the range of 10-30 minutes from the instant of pouring the adhesive out from a non-transparent container. The inspection of the reservoir a year after the repair showed that it was still sealed.

EXAMPLE 2

An adhesive obtained by following the technology described in Example 1 consists of the components in weight parts:

| | |
|---|---|
| 40% solution of oligodiethyleneglycol maleatephthalate in methylmethacrylate | 100, |
| product of interacting 1 mole of urethane prepolymer obtained from 4,4'-diphenylmethanediisocyanate and ethyleneglycolsebacatephthalate with 0.1 mole of perfluoromethyl alcohol and 1.9 moles of ethyleneglycol monomethacrylate | 10, |
| α-methylbenzoyl | 2. |

Said adhesive was used for strengthening thin plates from fissured natural stone. The adhesive was applied as a thin layer to a horizontal plate surface and hardened by UV-light illumination. Tests have shown that the plates thus treated were not destroyed along the cracks.

EXAMPLE 3

An adhesive obtained by following the technology described in Example 1 consists of the components in weight parts:

| | |
|---|---|
| 70% solution of oligotriethyleneglycol maleate-sebacate in butylmethacrylate | 100, |
| product of interacting 1 mole of urethane prepolymer, obtained from toluenediisocyanate and triethyleneglycoladipate, with 0.1 mole of perfluorodecyl alcohol, and 0.1 mole of ethyleneglycol monomethacrylate | 300, |
| α-methylbenzoyl | 2. |

Said adhesive was used for coating a concrete chamber so as to seal it. The adhesive was hardened under the effect of daylight for 3 hours. Tests have shown that the concrete impregnated with the adhesive is vacuum-tight.

EXAMPLE 4

An adhesive obtained by following the procedure described in Example 1 consists of the components in weight parts:

| | |
|---|---|
| 60% solution of oligodiethyleneglycol glycerolmaleatephthalate in triethyleneglycoldimethacrylate | 100, |
| product of interacting 1 mole of urethane prepolymer obtained from diethyleneglycoladipate and 4,4'-diphenylemethanediisocyanate, 1.9 moles of perfluoropropyl alcohol and 0.1 mole of ethyleneglycol monomethacrylate | 20, |
| methylethylketone peroxide | 2, |
| cobalt napthenate | 1. |

Said adhesive was used for repairing technological pipelines in a ship machine-room. The repair was performed by impregnating glass fabric with the adhesive and putting it on pipelines. The pipeline surface was not cleaned from lubricants. Inspection performed 2 years after the repair has shown that the pipelines were in good state.

EXAMPLE 5

An adhesive obtained by following the procedure described in Example 1 consists of the components in weight parts:

| | |
|---|---|
| 70% solution of oligotriethyleneglycol maleatephthalate in α-methylstyrene | 100, |
| product of interacting 1 mole of urethane prepolymer obtained from triethyleneglycolsebacate and toluelenediisocyanate, 0.3 mole of fluorinated alcohol of the formula $C_{15}F_{31}OH$, and 0.5 mole of ethyleneglycol monomethacrylate | 200, |
| α-methylstyrene | 0.5, |
| aluminium powder | 200. |

Said adhesive was used for coating metal reservoir without cleaning it from corrosion and oil. Inspection conducted in 2 years has shown that the reservoir surface was in satisfactory state.

EXAMPLE 6

An adhesive obtained by following the procedure described in Example 1 consists of the components in weight parts:

| | |
|---|---|
| 70% solution of oligodiethyleneglycol maleatephthalate in styrene | 100, |
| mixture of 1 weight part of a product of interacting allyl alcohol with 1,4-naphthalenediisocyanate and 5 weight parts of urethane prepolymer which is a product of interaction between polydiethyleneglycoladipate with 1,4-naphtylenediisocyanate | 150, |
| methylethylketone peroxide | 4, |
| cobalt naphtenate | 0.5. |

Said adhesive was used for sealing seams in fuel containers. Tests have shown that the containers were sealed.

What is claimed is:

1. Adhesive composition consisting essentially of the following components in weight parts:

| | |
|---|---|
| 70% solution of oligodiethyleneglycol maleate in styrene | 100 |
| product of interacting urethane prepolymer, obtained from toluelenediisocyanate and polydiethyleneglycol adipate, with perfluoropentyl alcohol and ethyleneglycol monomethacrylate | 50 |
| α- methylbenzoyl | 1. |

* * * * *